(12) United States Patent
Yamada

(10) Patent No.: US 9,181,852 B2
(45) Date of Patent: Nov. 10, 2015

(54) MISFIRE PREVENTION WATER AGITATOR SYSTEM AND METHOD

(71) Applicant: Ford Global Technologies, LLC, Dearborn, MI (US)

(72) Inventor: Shuya Shark Yamada, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 273 days.

(21) Appl. No.: 13/802,139

(22) Filed: Mar. 13, 2013

(65) Prior Publication Data

US 2013/0306040 A1    Nov. 21, 2013

Related U.S. Application Data

(60) Provisional application No. 61/648,008, filed on May 16, 2012.

(51) Int. Cl.

| F02B 33/00 | (2006.01) |
|---|---|
| F02B 29/04 | (2006.01) |
| F02B 33/44 | (2006.01) |
| F28F 13/12 | (2006.01) |
| F02M 25/028 | (2006.01) |
| F02M 35/16 | (2006.01) |
| F02M 25/07 | (2006.01) |

(52) U.S. Cl.
CPC ............. *F02B 29/04* (2013.01); *F02B 29/0468* (2013.01); *F02M 25/028* (2013.01); *F02M 25/0707* (2013.01); *F02M 35/161* (2013.01); *Y02T 10/121* (2013.01); *Y02T 10/146* (2013.01)

(58) Field of Classification Search
CPC ............................ F02B 29/04; F02B 29/0468
USPC .................. 60/599, 605.1; 123/563; 165/119;
55/306; 96/372
See application file for complete search history.

(56) References Cited

U.S. PATENT DOCUMENTS

| 1,673,776 A | 6/1928 | Moore | |
|---|---|---|---|
| 3,835,918 A * | 9/1974 | Pilarczyk | 165/119 |
| 4,708,120 A * | 11/1987 | Mann | 123/563 |
| 5,809,981 A * | 9/1998 | Berg-Sonne | 123/563 |
| 6,408,831 B1 | 6/2002 | Craig et al. | |
| 8,056,338 B2 | 11/2011 | Joergl et al. | |
| 8,061,135 B2 * | 11/2011 | Rutherford | 60/599 |
| 8,191,366 B2 * | 6/2012 | Taylor | 60/599 |
| 8,783,233 B2 * | 7/2014 | Cockerill et al. | 123/563 |
| 2011/0094219 A1 * | 4/2011 | Palm | 60/599 |
| 2013/0019845 A1 * | 1/2013 | Meyer | 123/542 |

FOREIGN PATENT DOCUMENTS

| EP | 1607606 A1 | 12/2005 | | |
|---|---|---|---|---|
| JP | 2008111429 A * | 5/2008 | | F02B 29/04 |

* cited by examiner

*Primary Examiner* — Thai Ba Trieu
*Assistant Examiner* — Ngoc T Nguyen
(74) *Attorney, Agent, or Firm* — Julia Voutyras; Alleman Hall McCoy Russell & Tuttle LLP

(57) ABSTRACT

A misfire prevention water agitator system and method are disclosed. The system may include a boosted engine having a charge air cooler arranged in an engine intake passage downstream of a compressor and upstream of an intake manifold. The system may also include a bypass coupling an outlet tank of the charge air cooler with the intake manifold, the line including an agitator mounted within 45 degrees of vertical.

20 Claims, 6 Drawing Sheets

MISFIRE PREVENTION WATER AGITATOR SYSTEM AND METHOD

CROSS REFERENCE TO RELATED APPLICATIONS

The present application claims priority to U.S. Provisional Patent Application No. 61/648,008 filed on May 16, 2012, the entire contents of which are incorporated herein by reference for all purposes.

FIELD

The present application relates to methods and systems for controlling an ingestion rate of charge air cooler condensate by an engine, and specifically methods and systems wherein the condensate is passed to a container and then agitated with intake air while in the container in order to introduce the condensate in the intake air to be ingested at below a predetermined rate.

BACKGROUND AND SUMMARY

Many internal combustion engines include turbochargers, or superchargers configured to force more air mass into an engine's intake manifold and combustion chamber by compressing intake air with a compressor driven by a turbine disposed to capture energy from the flow of the engine exhaust gas. However, the compression of the intake air tends to heat it which tends to reduce the density of this charge air. It is known to use a charge air cooler to compensate for heating caused by supercharging. Charge air coolers may be used with gasoline engines and with diesel engines.

Smaller displacement turbo charged engines may be used in bigger vehicles to improve fuel economy. The hot compressed air from a compressor becomes cooler in a charge air cooler (CAC) to minimize spark retard. With hot humid air moisture may condense out in a charge air cooler if it is cooled below the dew point. It has been measured that on a humid day some engines can condense enough water to form a puddle in the bottom of the charge air cooler outlet tank while cruising at 70 mph for 60 min. One measurement showed a rate of puddle accumulation of 120 cc/60 min. In addition, if a driver goes into wide open pedal for, only 1 to 2 seconds, and then backs off the accelerator, a puddle in the end tank may form or grow rapidly. The engine can misfire if a big puddle is ingested at once during hard acceleration. For example, misfire has been shown to occur for water ingestion rates of greater than 20 cc/sec. This is not acceptable because the engine will not provide the power demanded. In addition, if the fuel injectors of the misfiring cylinders continue to inject fuel, the catalytic converter brick substrate can melt down from excessive heat.

Embodiments in accordance with the present disclosure may be used to prevent water condensation, and also to prevent water ingestion at rates high enough to cause misfire.

Embodiments may provide a drain tube at a location in the charge air cooler outlet tank where condensation may have a tendency to collect, and where the water condensate may puddle up. Embodiments may arrange an expansion chamber in line with the drain tube to collect the water. The expansion chamber may act as a water agitator to slow down the puddle ingestion into the engine through the drain tube. In addition, a valve may be disposed at an inlet to provide an agitating jet of the intake air to the water in the chamber. In this way, the valve may aid in atomizing the water into the intake air stream before it is passed through the intake manifold and into the combustion chamber. In this way, the condensate from the charge air cooler will be directed to the intact manifold of the engine in a controlled and measured way. In this way the engine will then be much less likely to misfire due to water ingestion.

Embodiments may provide a misfire prevention water agitator system and method. The system may include a boosted engine having a charge air cooler downstream of the compressor and having an air intake passage with a throttle between an intake manifold and the charge air cooler. The system may also include a line coupled in parallel with the air intake passage between the intake manifold and the charge air cooler, the line coupled to the intake manifold downstream of the throttle, the line including an agitator mounted within 45 degrees of vertical.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
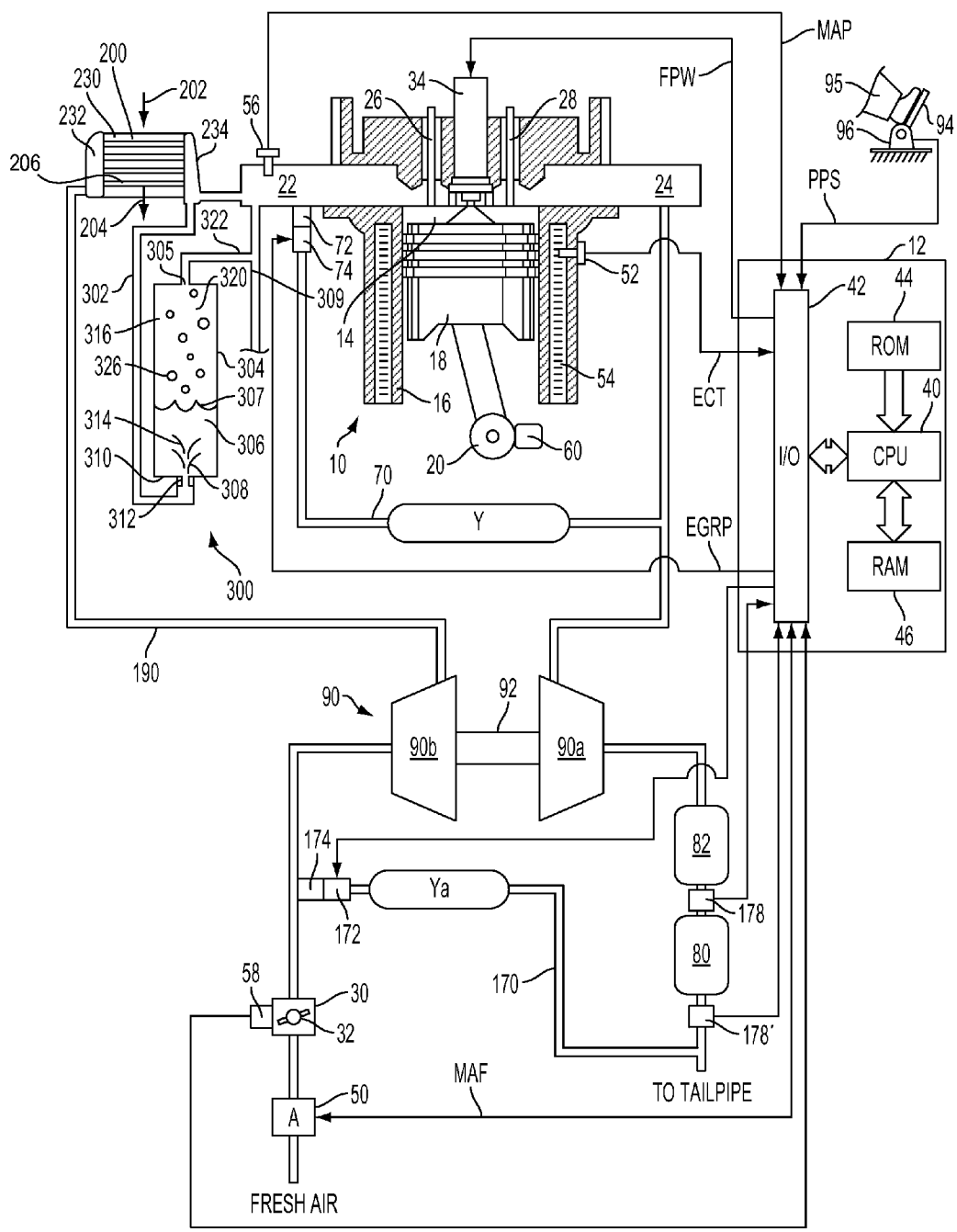
FIG. 1 shows an example vehicle system layout, including an air intake system and a charge air cooler arrangement and condensate control and misfire prevention system in accordance with the present disclosure.

FIG. 1 is a schematic diagram, not to scale or accurately proportioned, showing an example of an engine system, for example, an engine system generally at 10. The engine system 10 may be a diesel engine, or a gasoline spark-ignition engine, or other type of engine that may utilize various components in accordance with the present disclosure. Specifically, internal combustion engine 10 comprises a plurality of cylinders, one cylinder of which is shown in FIG. 1. Engine 10 is controlled by electronic engine controller 12. Engine 10 includes combustion chamber 14 and cylinder walls 16 with piston 18 positioned therein and connected to crankshaft 20. Combustion chamber 14 communicates with an intake manifold 22 and an exhaust manifold 24 via respective intake valve 26 and exhaust valve 28.

Intake manifold 22 communicates with throttle body 30 via throttle plate 32. In one embodiment, an electronically controlled throttle can be used. In one embodiment, the throttle is electronically controlled to periodically, or continuously, maintain a specified vacuum level in intake manifold 22.

While throttle body 30 is depicted as being upstream of a compressor device 90b, it will be appreciated that the throttle body may be placed upstream or downstream of the compressor. The choice may depend partly on the specific exhaust gas recirculation (EGR) system or systems that is/are used. Alternatively, or additionally, a throttle body may be placed in the exhaust line to raise exhaust pressure. This may be effective in helping to drive EGR, but may not be effective in reducing total mass flow through the engine. While not shown in FIG. 1, the cylinder may include a spark plug for providing spark-ignition combustion, where the spark timing may be controlled based on operating conditions.

Combustion chamber 14 is also shown having fuel injector 34 coupled thereto for delivering fuel in proportion to the pulse width of signal fuel pulse width (fpw) from controller 12. Fuel is delivered to fuel injector 34 by a conventional fuel system (not shown) including a fuel tank, fuel pump, and fuel rail (not shown). In the case of direct injection engines, as shown in FIG. 1, a high pressure fuel system may be used having a lower pressure and higher pressure pump.

In the depicted embodiment, controller 12 is a microcomputer, and includes a microprocessor unit 40, input/output ports 42, electronic memory 44, which may be an electronically programmable memory in this particular example, random access memory 46, and a conventional data bus.

Controller 12 may be configured to receive various signals from sensors coupled to engine 10, which may include but may not be limited to: measurements of inducted mass airflow (MAF) from mass airflow sensor 50 which may be coupled to the air filter A; engine coolant temperature (ECT) from temperature sensor 52 coupled to cooling jacket 54; a measurement of manifold pressure (MAP) from manifold pressure sensor 56 coupled to intake manifold 22; a measurement of throttle position (TP) from throttle position sensor 58 coupled to throttle plate 32; and a profile ignition pickup signal (PIP) from Hall effect sensor 60 coupled to crankshaft 20 indicating engine speed.

Engine 10 may include an EGR system to help lower $NO_x$ and other emissions. For example, engine 10 may include a high pressure EGR system in which exhaust gas is delivered to intake manifold 22 by a high pressure EGR tube 70 communicating with exhaust manifold 24 at a location upstream of an exhaust turbine 90a of a compression device 90, and communicating with intake manifold 22 at a location downstream of an intake compressor 90b of compression device 90. A high pressure EGR valve assembly 72 may be located in high pressure EGR tube 70. Exhaust gas may travel then from exhaust manifold 24 first through high pressure EGR valve assembly 72, and then to intake manifold 22. An EGR cooler [shown at Y in FIG. 1] is located in high pressure EGR tube 70 to cool re-circulated exhaust gases before entering the intake manifold. Cooling may be done using engine water, but an air-to-air heat exchanger may also be used.

Engine 10 may also include a low pressure EGR system. The depicted low pressure EGR system may include a low pressure EGR tube 170 communicating with exhaust manifold 24 at a location downstream of exhaust turbine 90a, and communicating with intake manifold 22 at a location upstream of intake compressor 90b. A low pressure valve assembly 172 may be located in low pressure EGR tube 170. Exhaust gas in the low pressure EGR loop may then travel from turbine 90a through a catalytic device 82 (for example, a three-way catalyst) and a second catalyst 80 before entering low pressure EGR tube 170. A low pressure EGR cooler Ya may be positioned along low pressure EGR tube 170.

In some alternate embodiments, catalytic device 82 may be located downstream of catalyst 80. In this case, the low pressure EGR could be extracted before or after the catalytic device 82. In yet other alternate embodiments, catalytic device 82 and device 80 may be combined into a single component.

Vacuum regulators 74 and 174 may be coupled to high pressure EGR valve assembly 72 and low pressure EGR valve assembly 172, respectively. Vacuum regulators 74 and 174 may receive actuation signals from controller 12 for controlling the valve positions of EGR valve assembly 72. In one embodiment, high pressure EGR valve assembly 72 and low pressure EGR valve assembly 172 are vacuum actuated valves. However, any type of flow control valve or valves may be used such as, for example, an electrical solenoid powered valve or a stepper motor powered valve.

Further, drive pedal 94 is shown along with a driver's foot 95. Pedal position sensor (pps) 96 measures angular position of the driver actuated pedal. Further, engine 10 may also include exhaust oxygen sensors 178 and 178' for providing indication of exhaust air/fuel ratio. Exhaust oxygen sensors 178 and 178' are shown coupled to catalytic devices 82 and 80. In some examples, sensors 178 and/or 178' may be placed in the exhaust manifold 24, or downstream of device 90. The oxygen sensors may be either a linear oxygen sensor or UEGO (universal or wide-range exhaust gas oxygen), a two-state oxygen sensor or EGO, a HEGO (heated EGO), a $NO_x$, HC, or CO sensor.

Compression device 90 may be a turbocharger or any other such device. The depicted compression device 90 may have a turbine 90a coupled in the exhaust manifold 24 and a compressor 90b coupled with the intake manifold 22 via an intercooler 200 which is may be an air-to-air heat exchanger, but could be water cooled. Turbine 90a is typically coupled to compressor 90b via a drive shaft 92. (This could also be a sequential turbocharger arrangement, single variable-geometry turbocharger (VGT), twin VGTs, or any other arrangement of turbochargers that could be used, and could include coolers within the compression device system such as between 2 stages of compression).

As mentioned intake passage 190 may include a charge air cooler 200 (e.g., an intercooler) to decrease the temperature of the turbocharged or supercharged intake gases. A flow of coolant shown by an incoming flow 202 and an outgoing flow 204 is shown with arrows; e.g., the charge air cooler 200 may include a coolant inlet 202 configured to receive coolant and a coolant outlet 204 configured to expel coolant. The source of the incoming flow 202 and the destination of the outgoing flow 204 have been omitted from the figure, but may include engine coolant that flows through the engine block, either before or after flowing through the charge air cooler and/or radiator (see FIG. 7). The coolant fluid that flows as incoming flow 202 and outgoing flow 204 may be air or another fluid such as water, or an appropriate chemical coolant, or a mixture thereof. In one case the charge air cooler 200 may be referred to as water cooled in another it 200 may be referred to as air cooled. The coolant in the charge air cooler 200 may be circulated in a coolant passage 206. It will be appreciated that the coolant passage 206 may have geometric features configured to aid thermal transfer between the intake passage 190 and the coolant passage 206. In this way, heat may be drawn away from the intake passage 190 via the charge air cooler 200. Thus, the temperature of the intake air delivered to the combustion chamber 14 may be reduced by increasing the air pressure, and increasing combustion efficiency.

The charge air cooler arrangement 220 may also include a plurality of cooling tubes 230 located in the charge air cooler 200. An inlet tank 232 may be located between an intake passage 190 and the charge air cooler 200 providing fluidic access of intake air to the plurality of cooling tubes 230. Various embodiments may include a charge air cooler 200 with various numbers of cooling tubes. In one example substantially all of the plurality of cooling tubes may number 21 tubes.

FIG. 1 also illustrates an example system 300 in accordance with the present disclosure that may be utilized to mitigate possible engine misfire that may be caused by excess water ingestion by the combustion chamber 14. As described, a condensate such as water may condense with the tubes 230 of the charge air cooler 200. The condensate may tend to collect in the outlet tank 234. The system 300 may include, or be part of a boosted engine 10. The boosted engine 10 may have a charge air cooler 200 downstream of the compressor 90b and may have an air intake passage 190 with a throttle 30 in between an intake manifold 22 and the charge air cooler 200. The system 300 may also include a line 302 coupled in parallel with the air intake passage 190 between the intake manifold 22 and the charge air cooler 200. The line 302 may be coupled with the intake manifold 22 downstream of the throttle 30. The line 302 may include an agitator 304.

The agitator 304 may be mounted within 0-45, or 0-50, or 0-10 degrees of vertical, such as at 10-25 degrees in one example. In this way, condensate 306 may accumulate in the agitator 304 in a way to substantially cover an inlet opening 308 at a bottom 310 of the agitator 304 such that the intake air will pass through the accumulated condensate 306 in the agitator 304 and not instead blow via another route to avoid robust agitation of the condensate 306.

The agitator 304 may include an outlet 305 located about a top surface 307 of the condensate 306. The outlet 305 may be configured to be coupled with the intake manifold 22 via a brake booster line 309, or other suitable passage.

In the example system 300 shown the boosted engine 10 may be a direct injection boosted gasoline engine. The throttle 30 may be adjustable to control output torque of the engine 10.

The agitator 304 may be a sonic agitator. The agitator 304 may include an inlet jet 312 configured to jet intake air, shown with multiple short curved lines 314 through the condensate 306, when present, in the agitator 304. The inlet jet 312 may be a supersonic jet.

With some example systems 300, the agitator 304 may include a vertically mounted expansion region 316 and the inlet opening 308 or orifice 308 coupled upstream of the expansion region 316. In some examples the orifice 308 may have an inner diameter of between approximately 1.5 to 2.5 mm. In some examples, the orifice 308 may have an inner diameter of approximately 2 mm.

With some example systems 300, the expansion region 316 may have an inner diameter of between approximately 1.0 and 1.5 inches. With some example systems 300 the expansion region 316 may have an inner diameter of approximately 1.25 inches.

With some example systems 300, an inner chamber 320 of the agitator 304, which may include the expansion region 316, may have length of between approximately 125 mm and 175 mm. With some examples, the length of the chamber may be approximately 150 inches.

In some cases, the entire length of the agitator 304 may be on the order of 300 mm and may include various fitting and ports, and/or orifices. In some cases the fittings may be end caps having openings there through for ports or orifices to pass and to provide sealing engagement with respective upstream and downstream elements of the system 300. The fittings may be made of, for example plastic. Various fittings may be made of, for example, brass.

Parameter selection of the agitator 304 may affect the rate at which moisture is passed to the combustion chamber 14. For example, the size of the inner diameter of the agitator 304 may affect a rate of agitation and therefore a rate at which the condensate is reintroduced into the intake air. As another example the relative length of agitator 304 may affect how long it may take to dry out the agitator 304.

Figure 2:
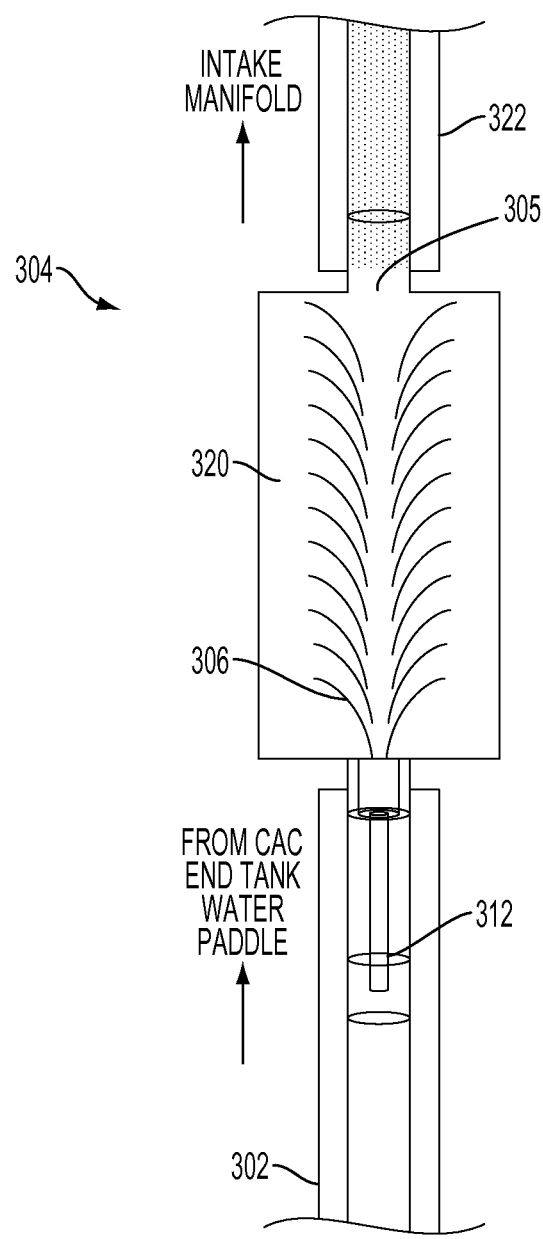
FIG. 2 is a sectional view illustrating an example agitator in accordance with the present disclosure.

FIG. 2 is a sectional view illustrating an example agitator 304 in accordance with the present disclosure. The agitator 304 illustrates an outlet 305 that may be coupled with the intake manifold 22 (not shown in this FIG.) via a hose 322. The hose may have an inner diameter of, for example, 5/16". Other sizes are possible. In one example, a volume of condensate 306 may be agitated and may become atomized into the stream of the intake air at a rate, for example, of 90 ml in approximately 10 minutes.

FIG. 2 also illustrates an example orifice 312 having an example inner diameter of 2 mm. The diameter may vary from this, for example 2 mm±1 mm. However, still other sizes may also be used. The orifice 312 may be made from, for example, drilled brass stock. The example orifice 312 may create a supersonic flow at a relatively high pressure differential between respective upstream and downstream locations relative to the orifice.

Figure 3:
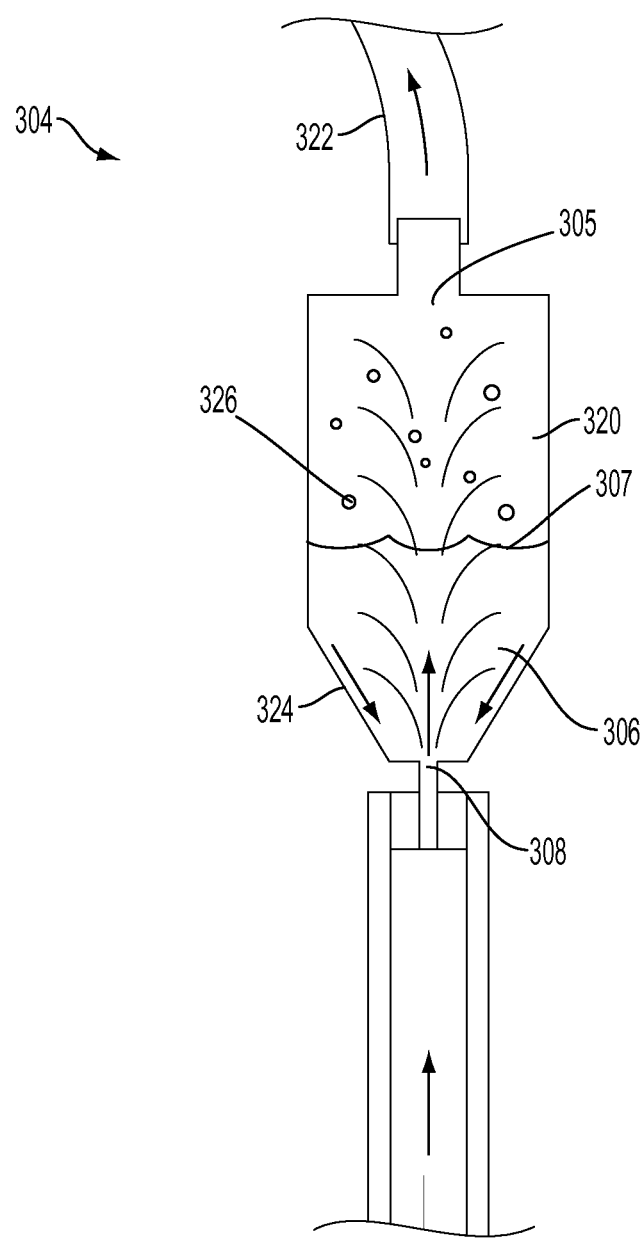
FIG. 3 is a sectional view illustrating another example agitator in accordance with the present disclosure.

FIG. 3 is a sectional view illustrating another example agitator 304 in accordance with the present disclosure. In this example, is also shown in FIG. 2 the inner chamber 320 of the agitator 304 may be substantially tubular. However, in this example at least a bottom portion 324 of the chamber may be substantially cone shaped.

Various embodiments may provide a device 304 to regulate turbocharger condensate ingestion for an engine. The device 304 may include a chamber 320 configured to hold a quantity of condensate 306. An inlet 308 may be fluidically coupled with a charge air cooler outlet tank (not shown) to allow the condensate to move from the outlet tank to the chamber 320. In some cases the inlet 308 and at least a portion of the device 304 may be located below the outlet tank and the condensate 306 may move into the chamber 320 via gravity. The inlet 308 may be located below a top surface of the quantity of condensate when the condensate 306 is present in the chamber 320. The device 304 may also include an outlet 305 located above a top surface 307 of the condensate 306 coupled to an intake manifold 22 of the engine 10 such that the intake manifold 22 causes an negative pressure above the top surface 307 to cause intake air to pass from the inlet 308 through the condensate thereby agitating the condensate 306. The outlet 305 may be configured to be coupled with a brake booster line (not shown) to provide the negative pressure.

The chamber 320 and the inlet 308 may be sized and proportioned to agitate the condensate to suspend droplets 326 of the condensate 306 into the intake air at or below a preselected maximum moisture concentration for ingestion by the engine 10.

Figure 4:
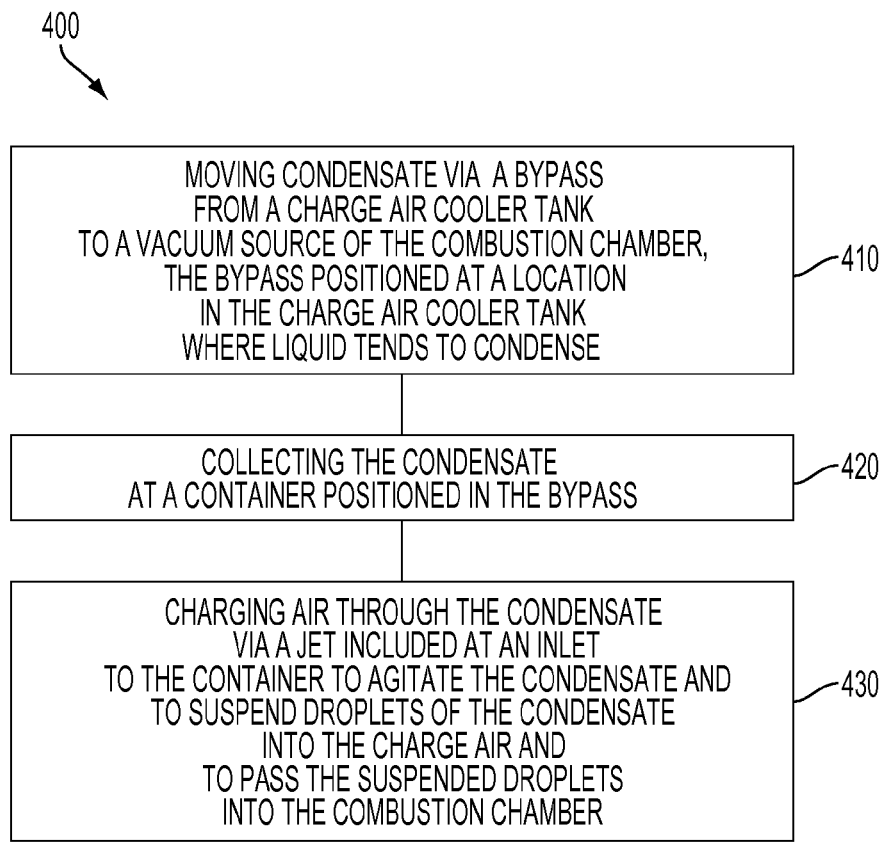
FIG. 4 is a flow diagram illustrating an example method in accordance with the present disclosure.

FIG. 4 is a flow diagram illustrating an example method 400 of mitigating excess condensation ingestion by a combustion chamber of a boosted engine. The method 400 may include, at 410, moving condensate via a bypass from a charge air cooler tank to a vacuum source of the combustion chamber, the bypass positioned at a location in the charge air cooler tank where liquid tends to condense. The method 400 may include, at 420, collecting the condensate at a container positioned in the bypass. The method 400 may also include, at 430, charging air through the condensate via a jet included at an inlet to the container to agitate the condensate and to suspend droplets of the condensate into the charge air and to pass the suspended droplets into the combustion chamber.

The charging air through the condensate may include causing the droplets of the condensate to be suspended into the charge air at a predetermined rate. The causing of the droplets of the condensate to be suspended into the charge air at a predetermined rate may include selecting a length of the chamber, and/or selecting a cross-sectional area of the chamber in conjunction with the length of the chamber in a way to tune the rate of suspension at preselected inlet air flow rates, or other selected operating parameters.

Figure 5:
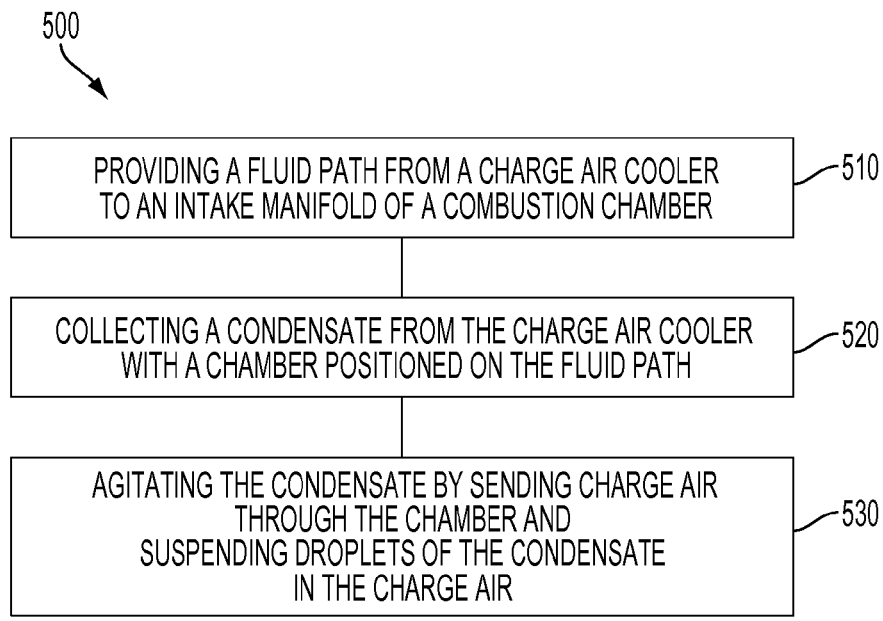
FIG. 5 is a flow diagram illustrating another example method in accordance with the present disclosure.

For example the charging air through the condensate may include sizing an inner diameter of the jet to cause the charge air to pass through the jet at supersonic speed. The charging air through the condensate via a jet may include passing charge air from the charge air cooler to the combustion chamber. In other cases it may be realized that the condensate may be suspended into the inlet air from a source that does not pass through the charge air cooler FIG. 5 is a flow diagram illustrating an example method 500 of reducing potential misfire of a boosted engine. The method 500 may include, at 510, providing a fluid path from a charge air cooler to an intake manifold of a combustion chamber. The method 500 may also include, at 520, collecting a condensate from the charge air cooler with a chamber positioned on the fluid path. The method 500 may also include, at 530, agitating the condensate by sending charge air through the chamber and suspending droplets of the condensate in the charge air.

The method 500 may also include positioning an agitation jet at an inlet side of the collection chamber such that charge air is forced through the condensate agitating the condensate and suspending droplets of the condensate in the charge air.

The method 500 may also include sizing and proportioning the collection chamber and the agitation jet to keep a rate of suspension of droplets into the charge air at or below a preselected maximum.

With the method 500 in some cases the sizing and proportioning the collection chamber and the agitation jet may include sizing the collection chamber to have an inner diameter of between approximately 1.0 and 1.5 inches and a length of between approximately 125 mm and 175 mm, and providing an orifice for the jet of between approximately 1.5 mm and 2.5 mm. In some cases the collection chamber may have an inner diameter of approximately 1.25 inches and a length of approximately 150 mm. The orifice for the jet may be approximately 2 mm.

Figure 6:
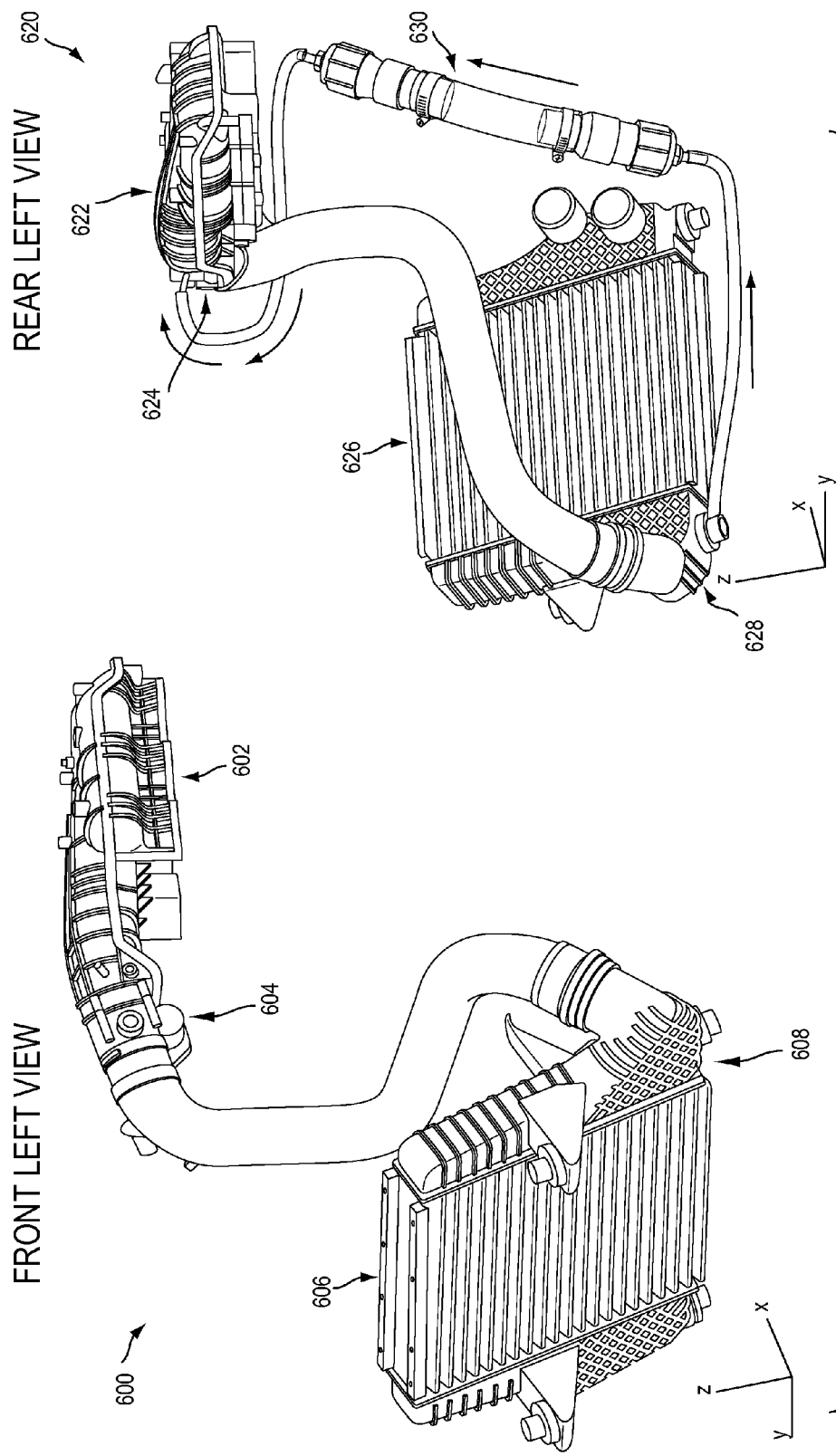
FIG. 6 is an approximate to scale drawing showing a front left view and a rear left view of a system illustrating the position of a charge air cooler and an agitator relative to an intake manifold and a throttle

FIG. 6 shows front left view and rear left view of a system illustrating the position of a charge air cooler and agitator 630 relative to an intake manifold and throttle. While the agitator and related components are only shown in rear left view, it is not shown in front left view in order to better illustrate the components that are shown. FIG. 6 is shown with vertical (relative to the ground on which a vehicle, including the engine and systems of FIGS. 1-5, is positioned) being toward the top of the figures. In this way, the charge air cooler (606 and 626, in front left view and rear left view respectively) is mounted at an angle as shown. Likewise, the agitator 630 is mounted within 0-50 degrees, of vertical. Charge air cooler 606 is positioned upstream of throttle 604 and intake manifold 602. In the absence of the agitator, a puddle of water accumulates in the front corner 608. Agitator 630 is mounted between charge air cooler outlet tank 628 and intake manifold 622.

Figure 7:
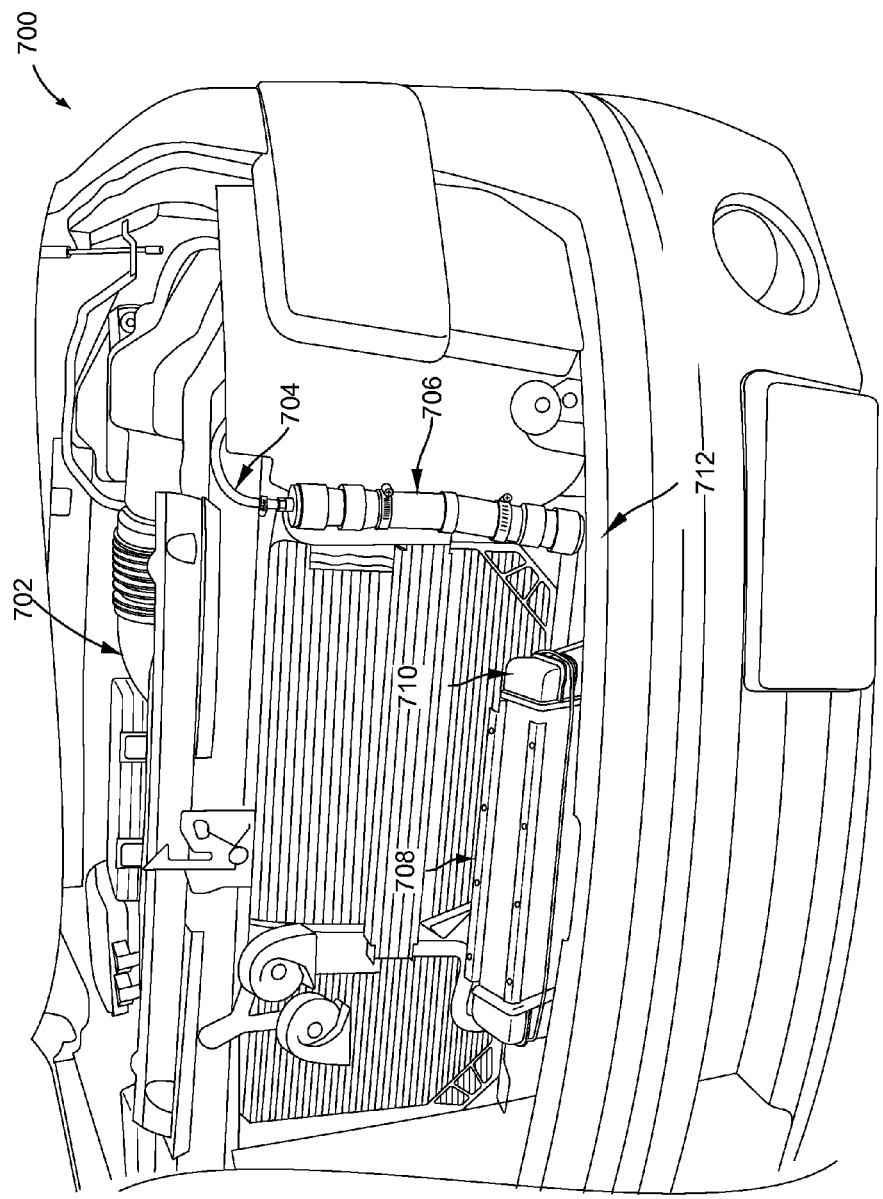
FIG. 7 shows an example configuration of the system installed in a vehicle.

FIG. 7 is an example of an agitator system installed in a vehicle 700. Agitator 706 may be positioned in front of the radiator. In some examples, the agitator 706 may be positioned directly behind the radiator. When positioned behind the radiator, the agitator 706 may be kept warm by the radiator. Intake manifold 702 and 2 mm orifice 712 below the agitator 706 are hidden from view. The agitator 706 may be coupled to the intake manifold 702 by an outlet hose 704, and may be in communication with a charge air cooler end tank 710 of a charge air cooler 708. Note that FIG. 7 shows the positioning of the components with respect to various other vehicle components, such as the headlights, grill opening, hood latch, etc.

It will be understood that the depicted engine 10 is shown, only for the purpose of example, and that the systems and methods described herein may be implemented in or applied to any other suitable engine having any suitable components and/or arrangement of components.

Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method of mitigating excess condensation ingestion by a combustion chamber of a boosted engine comprising:
    moving condensate via a bypass from a charge air cooler tank to a vacuum source of the combustion chamber, a first end of the bypass coupled at the tank and a second end of the bypass communicating with the combustion chamber, the tank further communicating with the combustion chamber via an engine intake passage coupling the tank with an engine intake manifold;
    collecting the condensate at a container positioned in the bypass; and
    charging air through the condensate via a jet included at an inlet to the container to agitate the condensate, suspend droplets of the condensate into the charge air, and pass the suspended droplets into the combustion chamber.

2. The method of claim 1, wherein charging air through the condensate includes suspending the droplets of the condensate into the charge air at a predetermined rate.

3. The method of claim 1, wherein charging air through the condensate includes sizing an inner diameter of the jet to cause the charge air to pass through the jet at supersonic speed.

4. A vehicle system, comprising:
    a boosted engine having a charge air cooler arranged in an intake passage downstream of a compressor and upstream of an intake manifold, a charge air cooler outlet coupled with the intake manifold via each of the intake passage and a bypass line, the bypass line having an agitator arranged therein, the agitator mounted within 45 degrees of vertical relative to the ground on which the vehicle is positioned.

5. The system of claim 4, wherein the boosted engine is a direct injection boosted gasoline engine.

6. The system of claim 4, wherein the agitator is a sonic agitator.

7. The system of claim 4, wherein the agitator includes an inlet jet configured to jet intake air through condensate, when present, in the agitator.

8. The system of claim 7, wherein the inlet jet is a supersonic jet.

9. The system of claim 4, wherein the agitator includes an expansion region, the expansion region mounted vertical to the ground on which the vehicle is positioned, and an orifice coupled upstream of the expansion region.

10. The system of claim 9, wherein the orifice has an inner diameter of 2 mm.

11. The system of claim 9, wherein the orifice has an inner diameter of between 1.5 to 2.5 mm.

12. The system of claim 9, wherein the expansion region has an inner diameter of between 1.0 and 1.5 inches.

13. The system of claim 9, wherein the expansion region has an inner diameter of 1.25 inches.

14. The system of claim 9, wherein the expansion region is cylindrical.

15. The system of claim 9, wherein at least a bottom portion of the expansion region is cone shaped.

16. A device to regulate turbocharger condensate ingestion for a vehicle engine comprising:
    a chamber configured to hold a quantity of condensate,
       an inlet of the chamber fluidically coupled with a charge air cooler outlet tank to allow the condensate to move from the outlet tank to the chamber; and
       an outlet of the chamber located vertically above the inlet relative to the ground on which the vehicle is positioned, the outlet coupled to an intake manifold of the engine such that the intake manifold causes a negative pressure above a top surface of the condensate in the chamber to cause intake air to pass from the inlet of the chamber through the condensate, thereby agitating the condensate.

17. The device of claim 16, wherein the chamber and the inlet are sized and proportioned to agitate the condensate to suspend droplets of the condensate into the intake air at or below a preselected maximum moisture concentration for ingestion by the engine.

18. The device of claim 16, wherein the chamber is substantially tubular.

19. The device of claim 16, wherein at least a bottom portion of the chamber is cone shaped.

20. The device of claim 16, wherein the outlet is configured to be coupled with a brake booster line to provide the negative pressure.

* * * * *